Apr. 3, 1923.
M. P. NICHOLS
1,450,510
HEADLIGHT INSTALLATION FOR AUTOMOBILES
Filed Jan. 20, 1920
3 sheets-sheet 1
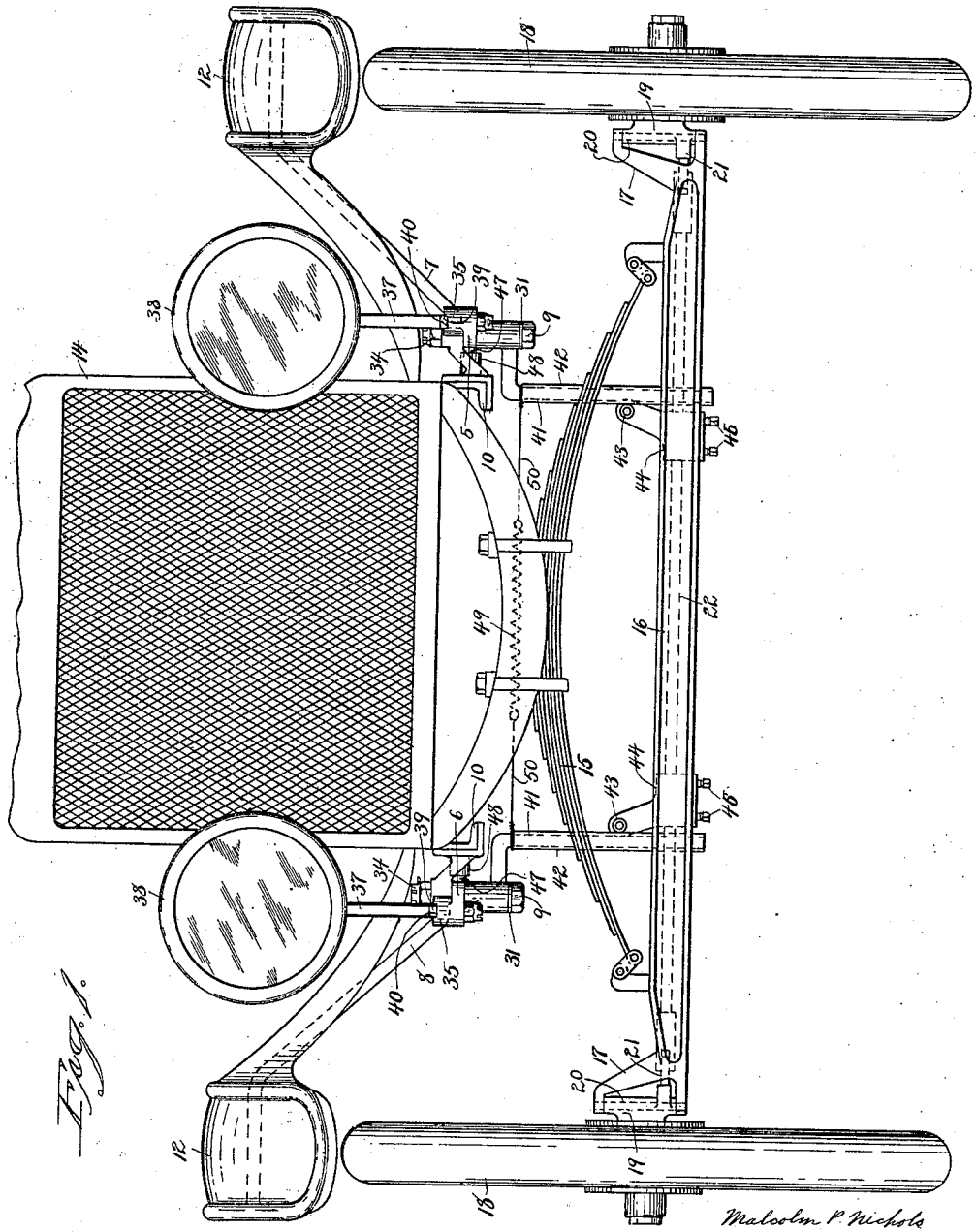

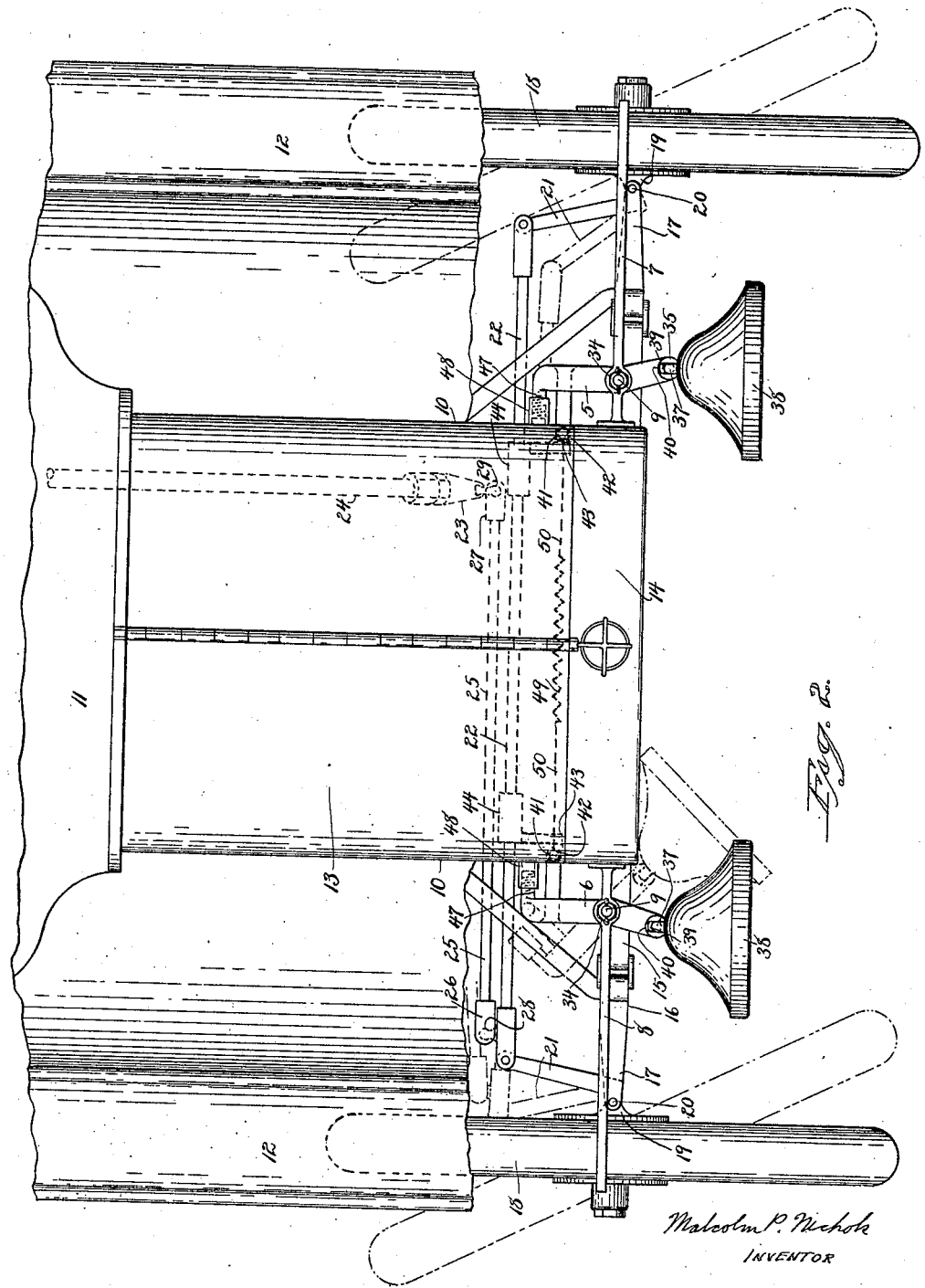

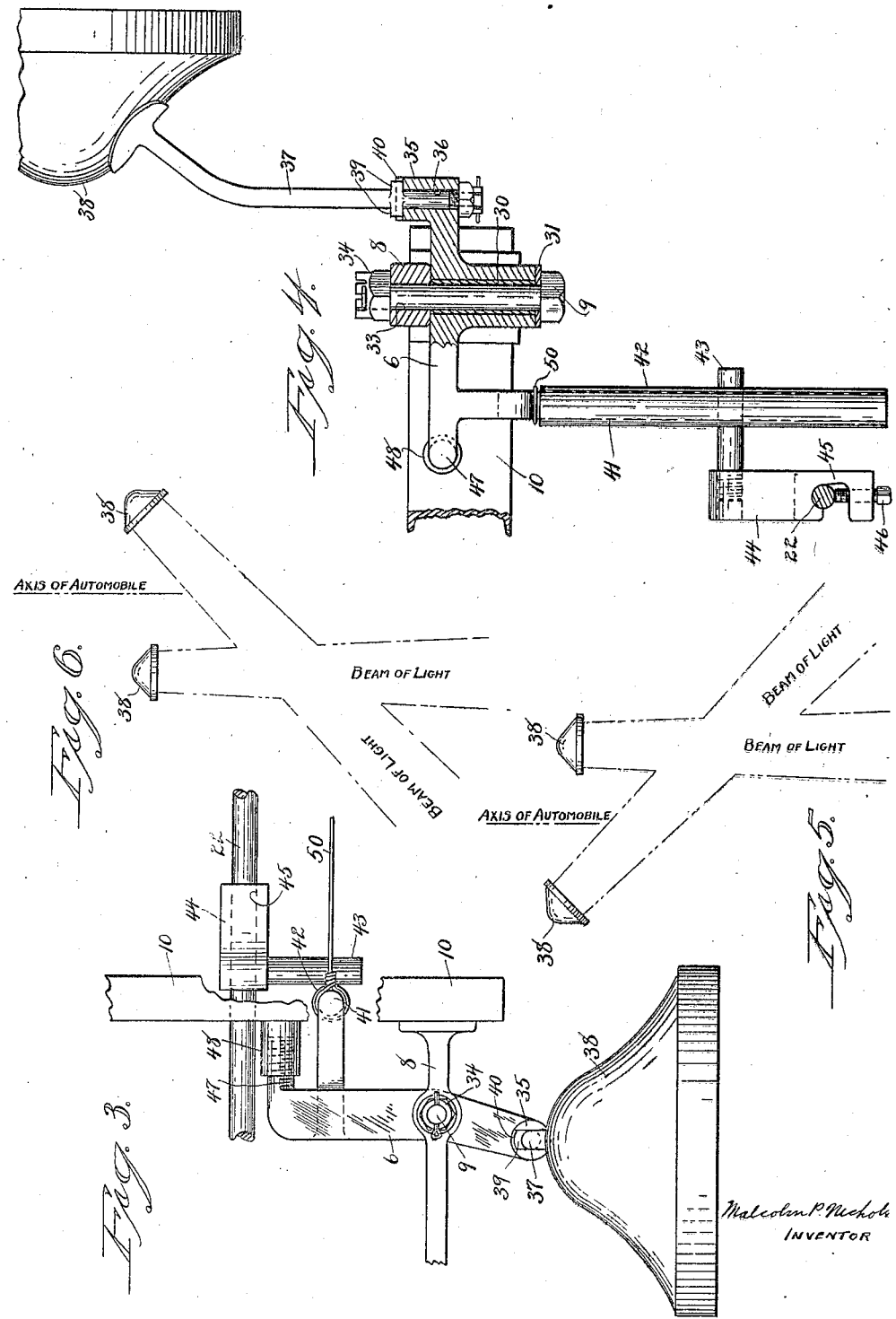

Patented Apr. 3, 1923.

1,450,510

UNITED STATES PATENT OFFICE.

MALCOLM P. NICHOLS, OF NEW HAVEN, CONNECTICUT.

HEADLIGHT INSTALLATION FOR AUTOMOBILES.

Application filed January 20, 1920. Serial No. 352,833.

*To all whom it may concern:*

Be it known that I, MALCOLM P. NICHOLS, a citizen of the United States, residing at New Haven, in the county of New Haven and State of Connecticut, have invented a new and useful Improvement in Headlight Installations for Automobiles; and I do hereby declare the following, when taken in connection with the accompanying drawings and the characters of reference marked thereon, to be a full, clear, and exact description of the same, and which said drawings constitute part of this application, and represent, in—

Fig. 1, a broken view in front elevation of an automobile provided with my improved headlight installation with the headlights shown in their normal positions.

Fig. 2, a broken plan view thereof showing by full lines the normal positions of the parts, and by broken lines the positions which the parts assume when the automobile is turning a curve to the left.

Fig. 3, an enlarged broken detail plan view of the right-hand converting lever, headlight, actuator, and the closely associated parts.

Fig. 4, a similar view of the same in side elevation and partial section.

Fig. 5, a diagrammatic view showing the positions assumed by the headlights when the automobile is turning a curve to the left.

Fig. 6, a similar view showing the positions assumed by the headlights when the automobile is turning a curve to the right.

My invention relates to an improvement in dirigible headlight installations for automobiles and particularly to that class of installations which simultaneously and automatically illuminate the area directly in front of the automobile and the area into which the automobile is being steered when the same is turning a curve.

The object of my invention is to provide a simple and reliable installation of the character mentioned which shall be easy to install, noiseless in operation, and sensitive and responsive to slight changes in direction of the automobile.

A further object of my invention is to produce as a new article of manufacture, an attachment for converting a fixed headlight installation of an automobile into a dirigible installation therefor, without necessitating machining operations thereon, such as drilling, reaming, etc.

A further object of my invention is to produce a converting attachment, provided with adjustable means whereby the normal forward-pointing position of the headlight may be adjustable so as to compensate for variations in the structure and for wear.

With these ends in view, my invention consists in a headlight installation having certain details of construction and combination, and arrangement of parts, as will be hereinafter described and particularly recited in the claim.

In carrying out my invention, as herein shown, I pivot two corresponding lever-like converting members 5 and 6 on the front left hand and right hand fender-brackets 7 and 8 respectively, by means of studs 9. The brackets 7 and 8 are secured to the forward end of the chassis frame 10, which also carries the usual automobile body 11, fenders 12, engine hood 13, and radiator 14.

The chassis frame 10 is supported at its forward end by a leaf spring 15, secured in the customary manner to the front axle 16. The opposite ends of the axle 16 are formed with yokes 17 to each of which is pivoted one of the two front wheels 18, by means of a bracket 19 and pin 20. Extending rearward from each of the brackets 19 is bracket-arm 21, pivotally connected to the other bracket-arm, by means of a coupling-rod 22. The coupling-rod 22 is connected to the steering lever 23 of the steering column 24 by means of a link 25, having at its opposite ends the socket-member 26 and 27 of two ball-and-socket joints; whose complementary ball members 28 and 29 are respectively located on the rod 22 and lever 23 aforesaid as shown in Fig. 2.

The construction referred to in the preceding paragraph is all of the usual type, and to which I make no claim.

The arms 21, coupling-rod 22, lever 23, steering column 24, and steering wheel (not shown), constitute the steering mechanism of the automobile and will hereinafter be referred to as such.

The lower portion of each of the studs 9 has slipped over it a bronze sleeve 30, which is engaged at its lower end by a washer 31, resting on the head of the stud. At its upper end the sleeve 30 engages the lower face of its respective fender bracket 7 and 8, and performs the double function of a spacing member for the stud 9 and a bearing for its respective converting member 5 or 6. Each of the studs 9 extends upward through a hole 33 provided for it in its respective fender bracket 7 or 8 and is furnished at its extreme upper end with a castellated nut 34.

The forward end of each of the converting members 5 and 6 is formed with a boss 35, having a perforation 36, for the reception of the lower end of its respective headlight bracket 37, each of which carries at its upper end a headlight body 38 of usual and ordinary construction. In order to prevent the headlight bracket 37 from turning with respect to the members 5 and 6, each is formed just above its threaded extreme lower end with two outstanding ears 39 which rest in a groove 40 formed in the upper face of each of the bosses 35. Near the opposite and rear end of each of the converting members 5 and 6 is an integral, laterally offset depending arm 41 having a tubular rubber covering 42 engaged at its lower end by its respective forwardly projecting actuator-tube 43, each carried by an actuator-clamp 44. The actuator-clamps 44 are each formed with a longitudinal recess 45 through which the coupling-rod 22 extends and to which the clamp is rigidly secured by means of set screws 46.

At the extreme inner end of each of the converting members 5 and 6 is an integral threaded stop-finger 47 projecting laterally inward at a right-angle therefrom. Screwed onto each of the stop-fingers is an adjustable tubular rubber stop-cushion 48 normally resting against the chassis frame 10.

For normally maintaining the stop-cushions 48 against the chassis frame 10 and hence maintaining the axes of the headlight bodies 38 parallel with the longitudinal axis of the car, I employ a helical spring 49 connected by means of wires 50 to the depending arms 41.

Having fully described the construction of my improved headlight installation, I shall now proceed to describe the operation thereof in detail.

Ordinarily when the automobile is traveling straight forward the stop-cushions 48 will be held against the chassis frame 10 as above described by the helical spring 49 with the effect of holding the headlight bodies 38 pointing directly ahead. If now the steering mechanism be operated so as to turn the front wheels to the left and hence steer the car in the same direction, the right hand actuator tube 43 will engage with the depending rubber-covered arm 41 of the right hand converting member 6 and turn the latter on its stud 9 against the tension of the spring 49 with the effect of pointing the right-hand headlight to the left, while the left-hand headlight remains at rest and pointed straight ahead, as clearly shown by the broken lines in Fig. 2, whereby one beam of light is projected parallel with the axis of the automobile and another beam of light is projected in the direction in which the car is being steered as shown in Fig. 5.

If on the other hand the steering mechanism be operated so as to turn the front wheels to the right, and hence steer the car in the same direction, the left-hand actuator tube 43 will engage with the depending rubber covered arm 41 of the left hand converting member 7 and turn the latter on its stud 9 against the tension of the spring 49, with the effect of pointing the left-hand headlight to the right, while the right-hand headlight remains at rest and pointed straight ahead, whereby one beam of light is projected parallel with the axis of the automobile, and another beam of light is projected in the direction in which the car is being steered as shown in Fig. 6.

As soon as the front wheels are "straightened out" after having turned a curve, the particular headlight which has been turned will simultaneously "straighten out" under the tension of the spring 49 and assume its normal position in which it points straight ahead.

The headlights of the Ford type of automobile, which type is shown in the accompanying drawings, are ordinarily rigidly secured to the fender-brackets 7 and 8. Owing to this peculiar and distinctive method of mounting the headlight installation the problems connected with converting it from a fixed to a dirigible installation are particularly difficult of solution.

By simply removing one of the headlights from its fender-bracket and substituting in its place one of my improved converting members and then re-mounting the headlight in the forward end of the converting member, the headlight becomes dirigible.

Attention is called to the fact that by inwardly offsetting the arms 41 of the converting members the initial inch movement of the actuators will cause the rotation of their respective headlights to a greater number of degrees than will the final inch movement of the actuators. This arrangement makes the converted headlight installation exceptionally sensitive when the automobile is turning a slight curve.

I claim:—

A headlight installation for automobiles, comprising two convertor-members pivotally mounted between their ends to the fender-brackets on opposite sides of an automobile; each member having a forwardly projecting and outwardly offset lamp-carrying arm, an inwardly turned stop-finger carrying an adjustable chassis-engaging cushion for regulating the outward movement of the lamp and located to the rear of the pivot, and an inwardly offset depending arm also located to the rear of the pivot and engaged by an actuator mounted on the spindle-connecting rod; the combination with a spring connecting the two members for normally holding the stop-cushions in engagement with the chassis.

In testimony whereof, I have signed this specification in the presence of two subscribing witnesses.

MALCOLM P. NICHOLS.

Witnesses:
RUTH M. ATWATER,
J. HAROLD FLYNN.